United States Patent [19]

Cerankowski et al.

[11] 3,932,360
[45] Jan. 13, 1976

[54] POLYURETHANE ELASTOMERS PREPARED FROM DIAMINE CURING AGENTS

[75] Inventors: Leon D. Cerankowski, Carlisle; Neil Mattucci, Billerica; Richard C. Baron, North Andover, all of Mass.

[73] Assignee: Polaroid Corporation, Cambridge, Mass.

[22] Filed: Apr. 22, 1974

[21] Appl. No.: 462,763

Related U.S. Application Data

[63] Continuation-in-part of Ser. No. 451,079, March 14, 1974, abandoned.

[52] U.S. Cl. .............. 260/77.5 AM; 260/2.5 AM; 260/75 NM; 117/161

[51] Int. Cl.² ........................................ C08G 18/32

[58] Field of Search 260/77.5 AM, 2.5 AM, 75 NM

[56] References Cited
UNITED STATES PATENTS
3,817,940  6/1974  Blahak et al. ............. 260/77.5 AM

OTHER PUBLICATIONS

Saunders et al., Polyurethanes, Part II, Interscience, N.Y., 1964, p. 353.

*Primary Examiner*—M. J. Welsh
*Attorney, Agent, or Firm*—Philip G. Kiely

[57] ABSTRACT

Diamine cured polyurethane products are prepared by combining an isocyanate terminated urethane prepolymer with a compound of the formula:

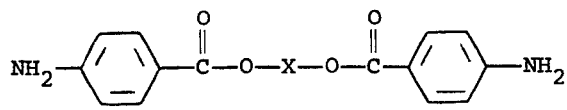

wherein X is a 2-12 carbon alkylene or cycloalkylene group.

21 Claims, No Drawings

POLYURETHANE ELASTOMERS PREPARED FROM DIAMINE CURING AGENTS

CROSS REFERENCE TO OTHER APPLICATIONS

This application is a continuation-in-part of application Ser. No. 451,079 filed Mar. 14, 1974, now abandoned.

BACKGROUND OF THE INVENTION

Hard, impact resistant, polyurethane products are particularly desirable. However, in attempting to obtain such products the art has met with some difficulty, particularly with regard to the selection of a suitable curing agent. Many diamines have been considered for use as a curing agent for isocyanate terminated polyurethane prepolymers, but most are generally dificient in some respect.

U.S. Pat. No. 3,188,302 discloses a class of diamine curing agents which are particularly suitable for use in preparing such polyurethane products. However, these materials also present difficulties, including toxicity problems during processing which includes the curing step.

U.S. Pat. No. 3,681,290 also discloses a class of diamine curing agents. These materials are also dificient, for example, in pot life.

The present invention is directed to novel diamine cured polyurethane products and to novel diamine curing agents suitable for use with isocyanate terminated prepolymers.

SUMMARY OF THE INVENTION

The present invention is directed to diamine cured polyurethane products prepared by combining an isocyanate terminated urethane prepolymer with a diamine compound of the formula:

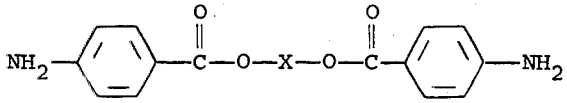

wherein X is a 2–12 carbon alkylene or cycloalkylene group and the rings are devoid of substituents other than the amine group.

DETAILED DESCRIPTION OF THE INVENTION

Isocyanate terminated urethane prepolymers are cured to provide strong, rubbery, abrasion resistant solids in conventional hot molding or in solvent based coating systems by means of the present invention. For solvent based systems the diamine curing agents of the present invention are soluble in several conventional solvents used for coating techniques and possess kinetics which provide useful working times and conditions and also provide the desired 3-dimensional structure in the cured polyurethanes.

In conventional hot molding techniques, the curing agents of the present invention possess melting points generally within the desired range for such techniques, a reasonable degree of supercooling properties, are compatible with a wide range of isocyanate terminated urethane prepolymers and, in general, exhibit kinetics that provide useful pot lifes and curing times. In addition, the curing agents are generally stable to decomposition at their melting points.

The novel curing agents may be represented by the formula:

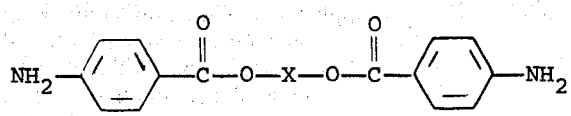

Each ring contains at least one amino group but may contain more than one, but contain no other substituents.

The alkylene and cycloalkylene groups represented by X in Formula A may be substituted or unsubstituted. Suitable substituents include 1–5 carbon alkyl groups, halogen, e.g., chloro or fluoro, and aryl groups, preferably phenyl. In a particularly preferred embodiment, the alkylene or cycloalkylene group designated X contains an odd number of carbon atoms, more preferably 3 or 5 carbon atoms.

The diamine curing agents useful in the present invention are prepared by reacting p-nitrobenzoyl chloride with a diol and reducing the thus-formed compound to the diamine.

As examples of diols suitable for use in the present invention, mention may be made of the following:

1,3-butanediol
1,4-butanediol
2,3-butanediol
2-n-butyl-2-ethyl-1,3-propanediol
3-chloro-1,2-propanediol
1,4-cyclohexanediol
2,5-dimethyl-2,5-hexanediol
2,2-dimethyl-1,3-propanediol
2,2-diphenyl-1,3-propanediol
1,12-dodecanediol
ethylene glycol
2-ethyl-1,3-hexanediol
2-ethyl-2-methyl-1,3-propanediol
1,7-heptanediol
1,6-hexanediol
2,5-hexanediol
2-methyl-1,4-butanediol
2-methyl-2,4-pentanediol
1,8-octanediol
1,5-pentanediol
2,4-pentanediol
1-phenyl-1,2-ethanediol
1,2-propanediol
1,3-propanediol
1,1,4,4-tetraphenyl-1,4-butanediol
2,2,4,4-tetramethyl-1,3-cyclobutanediol The following nonlimiting examples illustrate the preparation of the curing agents of the present invention.

EXAMPLE I

A solution of 74 g. of p-nitrobenzoyl chloride in 100 cc. of dry pyridine was heated to 40° C. with stirring and 15.2 g. of 1,3-propane diol was added dropwise over a period of about 15 min. The solution was refluxed an additional 5 hours and then poured into 1 liter of ice water. The precipitate was filtered and dried in a vacuum oven to yield 63 g. of 1,3-propane diol di-p-nitrobenzoate (m.p. 114°–115°). 64 g. of 1,3-propane diol di-p-nitrobenzoate were mixed with 500 cc. of absolute ethanol. The solution was flushed with nitrogen for 1 hour and then 1 g. of 10% palladium on charcoal (previously moistened with ethanol) was added. After stirring 15 min., 28 cc. of hydrazine hydrate was added dropwise over a period of about one-half hour. Heat was applied to maintain reflux for about 2 hours. The catalyst was then removed by filtered through Celite. After evaporation, the residue was recrystallized from 200 cc. ethanol to yield 40 g. of white 1,3-propanediol di-p-aminobenzoate (m.p. 125°–128° C.).

An elemental analysis showed the following for $C_{17}H_{18}N_2O_4$: Calculated: C, 65.0; H, 5.85; N, 8.95. Found: C, 65.06; H, 5.71; N, 8.95.

EXAMPLE II

To a solution of 18.5 g of p-nitrobenzoyl chloride in 200 cc. of tetrahydrofuran was added 3.1 g. of 1,2-ethanediol and the solution was refluxed for 2 hours. The solution was then poured into ice water, filtered and dried to yield 7.5 g. of 1,2-ethanediol di-p-nitrobenzoate (m.p. 107°–110° C.). The 1,2-ethanediol di-p-nitrobenzoate was reduced to 1,2-ethanediol di-p-aminobenzoate according to the procedure of Example I. The yield was about 3 g. of white solid that melted at 212°–215° C.

EXAMPLE III

To 37 g. of p-nitrobenzoyl chloride in 100 cc. of pyridine was added 18 g. of 1,3-butanediol and the solution was refluxed for 5 hours. The solution was poured into 1 liter of water, filtered and dried to provide 36 g. of 1,3-butanediol di-p-nitrobenzoate melting at 98°–100° C. Reduction was carried out according to the procedure of Example I to provide 12 g. of 1,3-butanediol di-p-aminobenzoate melting at 147°–150° C. and having the following elemental analysis:

Calculated: C, 65.7; H, 6.36; N, 8.73. Found: C, 65.85; H, 6.06; N, 8.45.

EXAMPLE IV

To 37 g. of p-nitrobenzoyl chloride in 100 cc. of pyridine was added 15.2 g. of 1,2-propanediol and the solution was refluxed for 5 hours. The solution was then poured into 1 liter of water, filtered and dried to provide 36 g. of 1,2-propanediol di-p-nitrobenzoate melting at 116°–120° C. Reduction was carried out according to the procedure of Example I to provide 12 g. of 1,2-propanediol di-p-aminobenzoate melting at 137°–138° C.

The novel polyurethane products of the present invention are prepared by combining an isocyanate terminated urethane prepolymer with the above-described diamine curing agent. Suitable isocyanate terminated urethane prepolymers for use in the present invention are known to the art and are disclosed, for example, in "Advances in Urethane Science and Technology", Vol. 1, K. D. Frisch and S. L. Regan, Technomic Publishing Company, New Jersey, 1971 and "Polyurethane Coatings", Keith Johnson, Noyes Data Corporation, New Jersey, 1972. Such isocyanate terminated prepolymers include those generally designated in the art as "polyester" and "polyether" types. Examples of preferred isocyanate terminated urethane prepolymers are disclosed in U.S. Pat. No. 3,188,302 which is incorporated herein by reference.

As stated above, the diamine curing agents and isocyanate prepolymers may be combined by conventional techniques known to the art, for example, by hot melt techniques or by solvent based techniques.

The term "curing agent" as used herein is intended to be synonymous with "chain extender" as conventionally used in the art.

The following non-limiting example illustrates the curing of an isocyanate terminated urethane prepolymer by the hot melt technique.

EXAMPLE V 10 g. of isocyanate terminated prepolymer containing about 4% by weight of available NCO groups and prepared from polytetramethylene ether glycol and 2,4-toluene diisocyanate, (sold under the trade name ADIPRENE L-100 by E. I. du Pont de Nemours & Company, Wilmington, Del.) was heated in a glass vessel to 110° C. 1.4 g. of 1,3-propanediol di-p-aminobenzoate, the diamine curing agent of Example I, was melted and heated to 150° C. The diamine was then added to the prepolymer, with thorough stirring, the mixture was degassed and poured into a metal mold preheated to 110° C. The mold and its contents were maintained at 110° C. for three hours. On removal from the mold, a tough, cured polyurethane elastomer was obtained. If desired, conventional post curing techniques may be employed.

As further evidence of the usefulness of the diamine curing agents in molding processes, 1,3-propanediol-p-di-aminobenzoate was studied by differential thermal analysis, thermogravimetric analysis and infrared spectroscopy to determine the stability of the diamine in the melt. 1,3-propanediol-p-di-aminobenzoate was maintained at its melting point for one hour and no weight loss or decomposition was observed, indicating that the diamine undergoes no deterioration in the hot melt.

Maintaining 1,3-propanediol-p-di-aminobenzoate above its melting point for 100 hours showed no observable ammonolysis. This is unexpected in view of the art, e.g., U.S. Pat. No. 3,681,290, wherein it was stated that aminoesters normally undergo ammonolysis at elevated temperatures and that chlorine substituents ortho to the amine group would provide the resistance to ammonolysis.

Oral toxicity studies in mice have shown the diamines employed in the present invention to be relatively non-toxic.

The following nonlimiting example illustrates the preparation of diamine cured polyurethane by the solvent method.

EXAMPLE VI 1.3 g. of 1,3-propanediol di-p-aminobenzoate was dissolved in 10 g. of 2-ethoxyethyl acetate with slight warming and the thus-formed solution was added to 10 g. of ADIPRENE L-100 and stirred thoroughly. The viscosity stability of the resulting solution was determined to be suitable for most applications, as determined by a Brookfield Viscometer Model LVT, spindle No. 3 at 60 r.p.m.

| Time (min) | Viscosity (cps) |
|---|---|
| 10 | 180 |
| 60 | 232 |
| 120 | 290 |

The solution was applied to glass and metal surfaces by spraying, dipping and drawn down techniques and cured at 110° C. for 3 hours. Tough elastomeric films were obtained.

EXAMPLE VII 7.0 g. of 1,3-propanediol di-p-aminobenzoate was dispersed in 50 g. of ADIPRENE L-100 at room temperature. The mixture was degassed in a vacuum and the temperature raised to 80° C. to increase fluidity. The mixture was then poured into a preheated metal mold and placed in an oven at 130° C. Within 20 minutes the solid dispersion was observed to melt and permeate the prepolymer. The oven temperature was lowered to 100° C. and the urethane demolded after 2 hours and then cured overnight at 80° C. A tough elastomer was obtained.

The utility of the curing agent of the present invention was compared to a commercial curing agent by the following procedure:

EXAMPLE VIII

The curing agents were placed in a sealed vessel, heated to about 140° C., degassed and then placed under a blanket of nitrogen. The urethane prepolymer (ADIPRENE L-100) was heated to about 170° F., degassed and placed under a blanket of nitrogen. The curing agent and the prepolymer were metered together into a mold preheated to 260° F. The mixture containing the curing agent of the present invention was held at 100° C. for about 1½ hours and then demolded. The prior art mixture was held at 130° C. for about 35 minutes and then demolded. Both the mixtures of the present invention and the prior art mixture were then oven-cured 6 hours at 100° C. and post-cured for 4 days at room temperature. The following table sets forth the properties of the polymers obtained by the above-indicated method.

TABLE 1 p.h.r. = parts per 100 parts of resin

|  | 1,3-propanediol di-p-aminobenzoate | | 4,4'-methylene-bis-(2-chloro-aniline) |
|---|---|---|---|
|  | 15.5 phr | 14 phr | 14 phr |
| Tensile Strength (psi) | *5796 | 4800 | 5700–6000 |
|  | *5926 | 5307 |  |
| 300% Modulus (psi) | 1172 | 1611 | 452–500 |
|  | 1135 | 1689 |  |
| 200% Modulus (psi) | 776 | 1041 | — |
|  | 752 | 1064 |  |
| 100% Modulus (psi) | 548 | 751 | 257 |
|  | 541 | 748 |  |
| 30% Modulus (psi) | 369 | 500 | 114–137 |
|  | 364 | 501 |  |
| % Elongation | 450 | 435 | 450–490 |
|  | 460 | 430 |  |
| Elongation Set | 10% | 8% | 10% |
|  | 10% | 9% |  |
| Durometer Shore A | 90–92 | 89–90 | 90 |

*slipped at jaws at tensile

The procedure described above was repeated with a polyester type prepolymer (3.9–4.2% isocyanate group) sold under the trade name PCA-407 by Polyurethane Corporation of America. The following table details the properties of the polymers produced thereby.

TABLE 2

|  | 1,3-propanediol di-p-aminobenzoate 14 phr | 4,4'-methylene-bis-(2-chloro-aniline) 14 phr |
|---|---|---|
| Tensile Strength (psi) | *7676 | 6500–7500 |
|  | *6514 |  |
| 300% Modulus (psi) | 1695 | 1200–1500 |
|  | 1741 |  |
| 200% Modulus (psi) | 1074 | — |
|  | 1086 |  |
| 100% Modulus (psi) | 824 | — |
|  | 833 |  |
| 30% Modulus (psi) | 570 | — |
|  | 625 |  |
| Elongation | 600% | 550–650% |
|  | 545% |  |
| Elongation Set | 25% | 6% |
|  | 24% |  |
| Durometer Shore A | 90 | 80 |

*slipped from jaws at tensile

From the foregoing it will be seen that in most respects, polymers prepared in accordance with the procedures of the present invention are superior or comparable to those prepared with one of the most widely used curing agents of the art.

Other curing agents within the scope of the present invention were employed in solvent and hot melt systems and similar satisfactory results were obtained.

The curing agents of the present invention may be employed singly, as shown above, or in combination of two or more in order to obtain the optimum properties of each curing agent. It should also be understood that conventional additives may be employed in the prepolymer curing agent composition, such as catalysts, fillers and plasticizers.

The cured polyurethane products prepared by the present invention may be employed wherever conventional polyurethanes are employed. For example, they are particularly useful for machine parts, potting and encapsulation of electronic equipment, and as a metal replacement. The cured polyurethane products of the present invention are particularly suitable for use in coating the fluid spreading apparatus in cameras of the self-developing type as disclosed in U.S. Pat. No. 3,779,144 issued Dec. 18, 1973.

The specific properties of the polymers formed by the method of the present invention will depend upon the specific isocyanate terminated prepolymer, the specific diamine curing agent, the ratio of isocyanate to amine and the curing cycle employed.

The curing agents of the present invention are satisfactorily employed in curing isocyanate terminated polyurethane compositions when used at a level of about 0.5:1 to 2:1 based on moles of amine to moles of isocyanate, more preferably, the ratio of 0.8:1 to 1.2:1.

What is claimed is:

1. A polyurethane product prepared by reacting an isocyanate terminated urethane prepolymer and a curing agent of the formula:

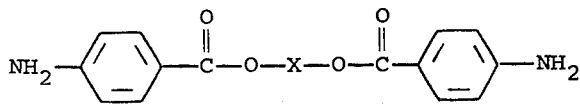

wherein X is a 2-12 carbon alkylene or cycloalkylene group.

2. The product of claim 1 wherein said urethane is a polyether type urethane prepolymer.

3. The product of claim 1 wherein said urethane is a polyester type urethane prepolymer.

4. The product of claim 1 wherein the ratio of said curing agent to said urethane prepolymer is 0.5:1 to 2:1 based on moles of amine to moles of isocyanate.

5. The product of claim 4 wherein the ratio of said curing agent to said urethane prepolymer is 0.8:1 to 1.2:1 based on moles of amine to moles of isocyanate.

6. The product of claim 5 wherein the ratio of said curing agent to said urethane prepolymer is 0.9:1 based on moles of amine to moles of isocyanate.

7. The product as defined in claim 6 wherein said urethane prepolymer has an isocyanate content of about 2-10% by weight.

8. The product of claim 1 wherein said urethane prepolymer has an isocyanate content of about 4% by weight.

9. The product of claim 1 wherein said reaction is carried out as a hot melt.

10. The product of claim 1 wherein said reaction is carried out in a solvent for said urethane prepolymer and said curing agent.

11. The product of claim 1 wherein said curing agent is 1,3-propanediol di-p-aminobenzoate.

12. The product of claim 1 wherein said curing agent is 1,3-butanediol di-p-aminobenzoate.

13. The method of preparing a cured polyurethane prepolymer which comprises reacting an isocyanate terminated urethane composition and a curing agent of the formula:

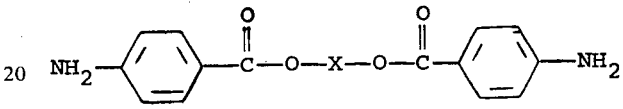

wherein X is a 2-12 carbon alkylene or cycloalkylene group.

14. The method of claim 13 wherein said reaction is carried out in a hot melt.

15. The method of claim 13 wherein said reaction is carried out in a solution.

16. The method of claim 13 wherein the ratio of said curing agent to said urethane prepolymer is 0.5:1 to 2:1 based on moles of amine to moles of isocyanate.

17. The method of claim 13 wherein said urethane prepolymer has an isocyanate content of about 4% by weight.

18. The method of claim 13 wherein said curing agent is 1,3-propanediol di-p-aminobenzoate.

19. The method of claim 13 which includes the step of applying the mixture of said urethane composition and said curing agent to a surface.

20. The product of claim 1 wherein said curing agent is 1,5-pentanediol di-p-aminobenzoate.

21. The method of claim 13 wherein said curing agent is 1,5-pentanediol di-p-aminobenzoate.

* * * * *